United States Patent [19]

Matsumoto

[11] Patent Number: 4,578,720

[45] Date of Patent: Mar. 25, 1986

[54] SELF-CLOCKING CODE DEMODULATOR WITH ERROR DETECTING CAPABILITY

[75] Inventor: Takeshi Matsumoto, Kanagawa, Japan

[73] Assignee: International Business Machines Corp. (IBM), Armonk, N.Y.

[21] Appl. No.: 518,897

[22] Filed: Aug. 1, 1983

[30] Foreign Application Priority Data

Aug. 6, 1982 [JP] Japan ................ 57-136400

[51] Int. Cl.[4] .............................................. G11B 5/02
[52] U.S. Cl. .................................................... 360/51
[58] Field of Search ............................. 360/51, 53, 45

[56] References Cited

U.S. PATENT DOCUMENTS

| | | | |
|---|---|---|---|
| 3,524,164 | 8/1970 | Cox et al. | 340/146.1 |
| 3,590,381 | 6/1971 | Ragsdale | 325/30 |
| 3,631,422 | 12/1971 | Krajewski et al. | 340/174.1 G |
| 3,656,064 | 4/1972 | Giles et al. | 329/104 |
| 3,760,412 | 9/1973 | Barnes | 340/347 DD |
| 3,810,235 | 5/1974 | Hopkins et al. | 360/51 |
| 4,037,257 | 7/1977 | Chari | 360/51 |
| 4,040,022 | 8/1977 | Takii | 360/51 |
| 4,127,879 | 11/1978 | Kashio | 360/51 |
| 4,275,466 | 6/1981 | Yamamoto | 360/51 X |
| 4,281,356 | 7/1981 | Sousa | 360/45 |
| 4,394,695 | 7/1983 | Mahon | 360/53 |

FOREIGN PATENT DOCUMENTS

| | | | |
|---|---|---|---|
| 46-7037 | 12/1971 | Japan . | |
| 52-02412 | 1/1977 | Japan | 360/51 |
| 54-11260 | 9/1979 | Japan | 360/38 |

Primary Examiner—Raymond F. Cardillo
Assistant Examiner—Alyssa H. Bowler
Attorney, Agent, or Firm—Bell, Seltzer, Park & Gibson

[57] ABSTRACT

A demodulator for reading a self-clocking frequency modulated code establishes time frames based on the reading process by which erroneous signal peaks can be detected. Signal peaks that fall outside of prescribed time frames are detected as errors, as are extra peaks occurring when only one is permitted. This demodulator is particularly useful in reading data from a magnetic stripe record on a bank passbook or credit card.

5 Claims, 5 Drawing Figures

SELF-CLOCKING CODE DEMODULATOR WITH ERROR DETECTING CAPABILITY

DESCRIPTION

1. Field of the Invention

This invention relates to a demodulator or a decoder for data signals that are read from a recording medium, more particularly, to a demodulator that detects errors while reading a record containing data signals recorded in accordance with a frequency modulation or self-clocking (F/2F) code.

2. Background Technology

U.S. Pat. No. 3,524,164, issued on Aug. 11, 1970, discloses a typical example of prior art device that detects errors in signals read from a recording medium. It detects errors by reviewing relations between the transition of input signals and a plurality of time frames that are determined by a series of single shot outputs. However, because the device is intended to detect errors along with demodulation of phase modulated signals, and is required to check the direction of the transitions, it is not suitable to detect errors in demodulating signals of a frequency modulation system. Further, because the length of the time frames is always fixed, satisfactory results cannot be obtained when handling reading signals in which length of signal parts representing each bit is somewhat varied.

There are known devices that demodulate reading signals in which length of signal parts representing each bit is somewhat varied. For example, a device disclosed in Published Unexamined Japanese patent application No. 7037/71, issued on Dec. 17, 1971, is designed so that it receives signals according to a frequency modulation system and generates a signal to determine a time frame of length equal to two-thirds of the time interval between a pair of preceding successive clock peaks. Data is determined to be "1" or "0" in response to whether or not a peak is received within the time frame. However, this device is not intended to detect errors, and therefore has a disadvantage in that it detects an abnormal peak as one representing correct data.

Therefore, an object of this invention is to provide a demodulator for frequency modulator coding, which demodulator has a capability to accurately detect abnormal conditions in signals read, to indicate such detection as an error.

SUMMARY OF THE INVENTION

The demodulator of this invention repeatedly measures the time duration between successive clock signal peaks by accumulating a count D of pulses from an oscillator. The count D is multiplied separately by constants $\alpha$, $\beta$ and $\gamma$ that have the relation of $0<\alpha<\beta<1\gamma$ to produce reference counts representing time intervals which can be measured from a valid clock signal peak. The time interval during which valid data signal peaks can be anticipated thus is $(\beta-\alpha)D$. Similarly, the time interval during which a valid clock signal peak can be anticipated is $(\gamma-\beta)D$. Signal peaks occurring before $\alpha D$ or after $\gamma D$ are detected as errors. Furthermore, more than one signal peak occurring in the interval $(\beta-\alpha)D$ is detected as an error.

In a preferred embodiment of this invention, the values of $\alpha=0.25$, $\beta=0.75$ and $\gamma=1.25$ are employed.

The demodulator, according to this invention, is particularly suitable to demodulate signals read from a passbook with a magnetic stripe or a card with a magnetic stripe. That is, when reading such recording media, it is very difficult to detect an abnormal signal peak as an error because the time duration between read signal peaks varies due to variation of the relative speed between a head and the recording medium. It is important that errors be detected because the recorded data is closely related to the handling of money.

EMBODIMENT

A preferred embodiment of the invention is described by referring to the drawings.

FIGS. 3 through 4(a) and 4(b) are timing diagrams that illustrate relations of various signals in the demodulator in FIG. 1 when processing abnormal input data signals.

Figure 1:
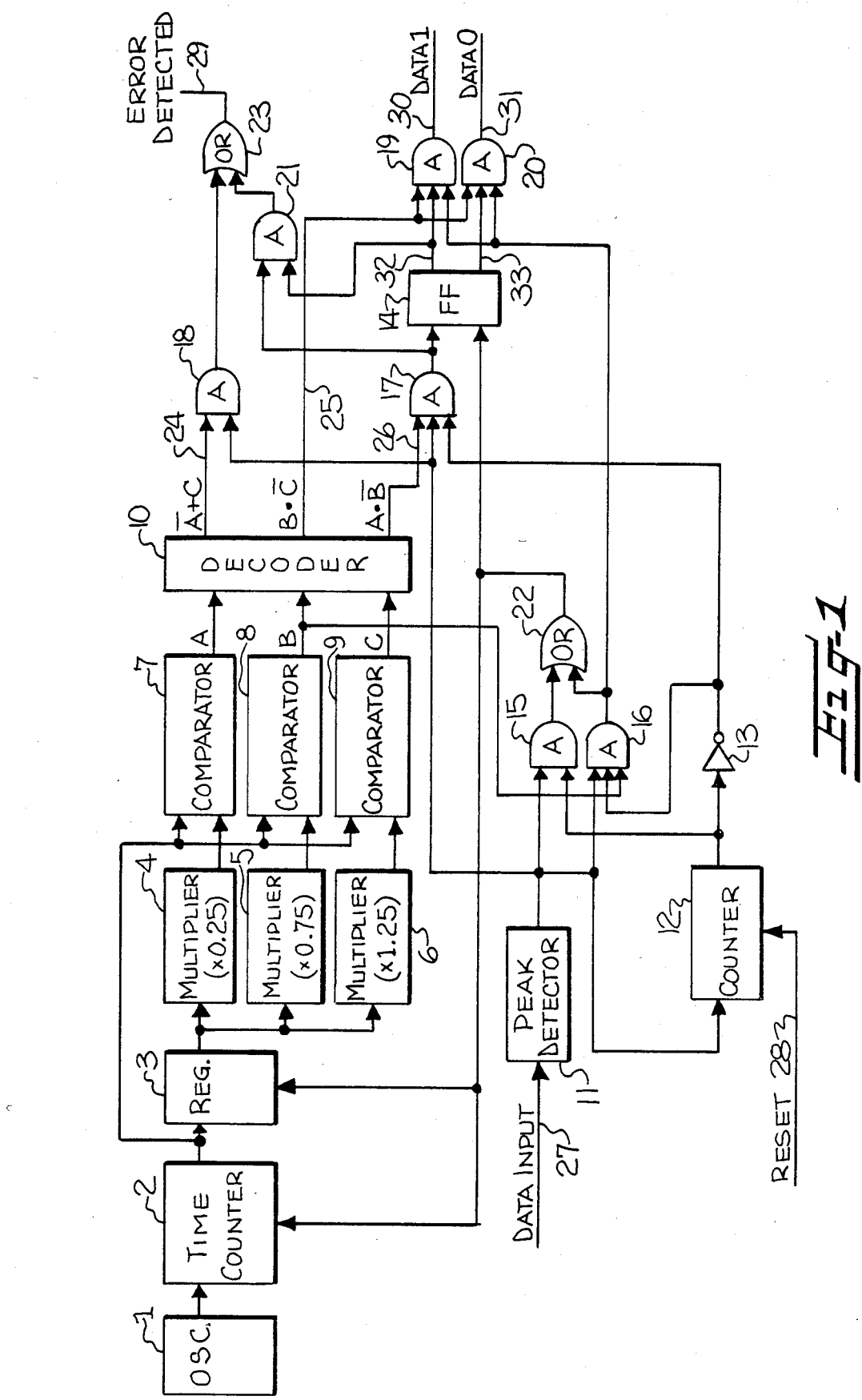
FIG. 1 is a block diagram of a demodulator with error detecting capability according to this invention.

FIG. 1 shows a construction of a demodulator that is incorporated with an arrangement for detecting errors according to the invention. The oscillator 1 generates a pulse train providing a large number of pulses during the intervals between input signals or peaks that appear on the line 27. A time counter 2 counts these pulses. The Count D of the time counter 2 is transferred to, and held at the register 3 whenever an output is generated from the OR circuit 22, as explained later. Count D is a measure of the time duration between successive clock signal pulses. The time counter 2 is reset at the same time of this transfer of the count, and restarts counting from an initial value.

The output side of the register 3 connects to multipliers 4, 5 and 6. The multipliers 4, 5 and 6 represent 0.25D, 0.75D and 1.25D that are obtained by multiplying the count D held in the register 3 by 0.25, 0.75 and 1.25, respectively. These outputs become inputs for the corresponding comparators 7, 8 and 9. Comparators 7, 8 and 9 receive the current count in the counter 2 as their other input and compare the current count with the outputs from the multipliers 4, 5 and 6 to generate control outputs A, B and C. Outputs A, B and C go from a low to a high level when the current count exceeds 0.25D, 0.75D and 1.25D, respectively. The control outputs A, B and C are connected to decoder 10 which generates three signals on the lines 24, 25 and 26 by logically combining the outputs A, B and C. The signal on the line 24 is at high level when the output A is at low level, or when the output C is at high level, $(\overline{A}+C)$. The signal on the line 25 is at high level when the output B is at high level, and when the output C is at low level. The signal $(B.\overline{C})$ is the time interval during which valid clock signals can be anticipated. The signal on the line 26 is at high level when the output A is at high level, and when the output B is at low level (A.$\overline{B}$). The signal (A.$\overline{B}$) is the time interval during which valid data signals can be anticipated. The relation between these signals is clearly shown in FIG. 2, as discussed later. The signal on the line 24 is the input for AND circuit 18, the signal on the line 25 inputs for AND circuits 19 and 20, the signal on the line 26 the input for AND circuit 17.

Figure 2:
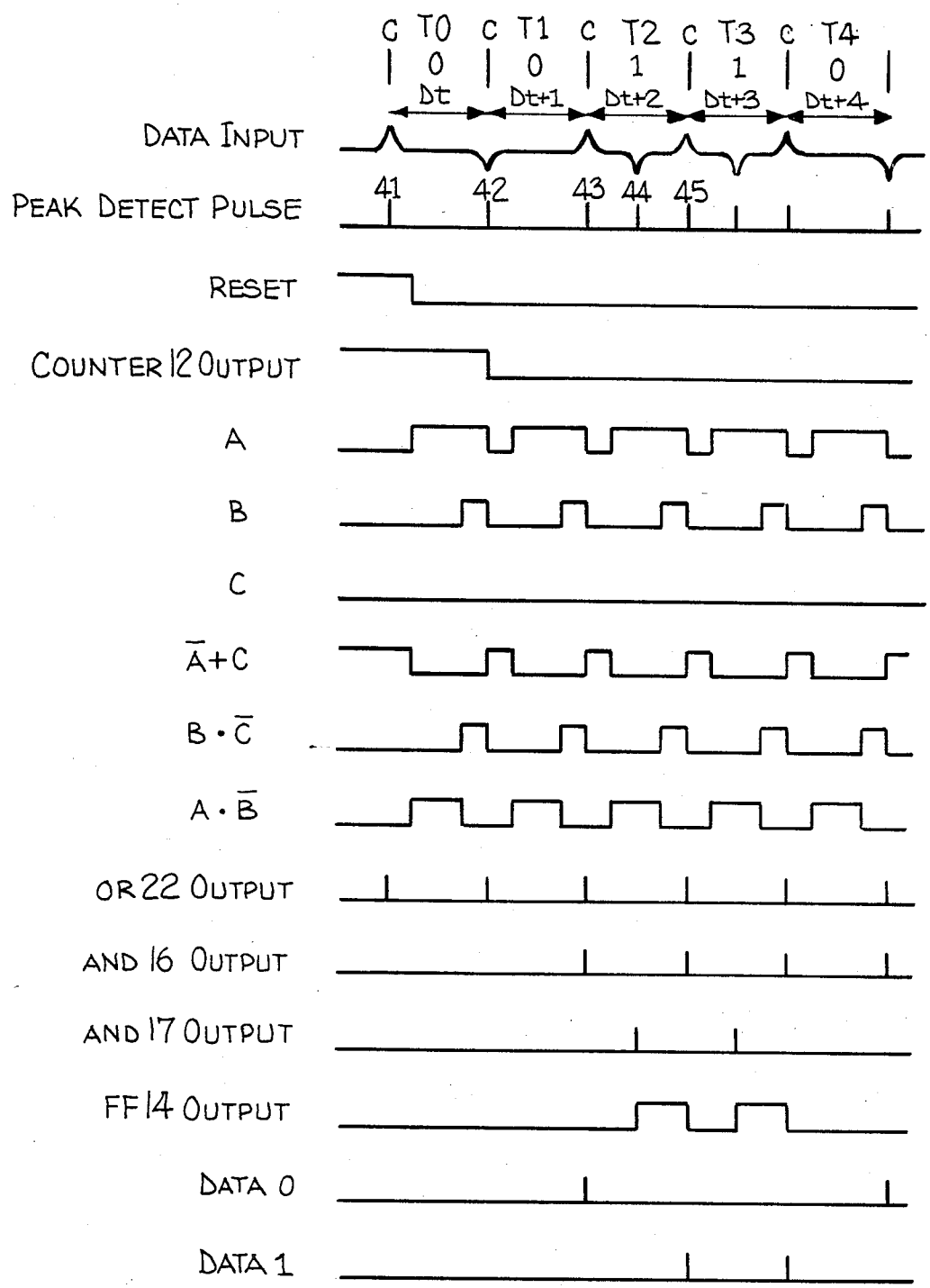
FIG. 2 is a timing diagram that illustrates relations of various signals in the demodulator in FIG. 1 when processing a normal input data signal.

Line 27 receives a signal input comprising a stream of binary signals obtained by reading a record recorded on a recording media such as a magnetic stripe with the frequency modulation system. The signal input has successive positive and negative peaks, as shown at the top of FIG. 2. The peaks below the indication c are clock peaks by which the bit intervals T0, Tl, T2 and the like are separated. For the particular code illustrated, a peak appearing at the center of a bit interval is a data peak represents a logical "1", and no data peak appearing at the center of a bit interval represents a logical "0".

A peak detector 11 receives the input data signals, detects all peaks, and generates corresponding peak detecting pulses that are supplied to the AND circuits 15, 16, 17 and 18, as well as to the counter 12. The counter 12 is designed to maintain high level output after being provided with a reset signal through the line 28, and to turn the output to low level after receiving N number of the peak detecting pulses generated by the peak detector 11. The output remains low until reset. Counter 12 is used to properly measure the duration of the bit interval that becomes a reference when starting the demodulation, while ignoring any noise that may be generated at the time to start the reading. Therefore, N is a value that can be determined at any magnitude, as the case may be. The example of the operation in FIG. 2 is a case of N=2. Namely, after second peak detecting pulse 42 is generated, the demodulation of the data is performed.

The output of the counter 12 is supplied to the AND circuit 15 and, after being inverted by inverter 13, to AND circuits 16 and 17. The AND circuit 16 also receives the output of the comparator 8. OR circuit 22 gates the pulses generated by the AND circuits 15 and 16 as the outputs. These outputs are used for controlling the time counter 2 and the register 3, as described above, and to reset a flip-flop 14.

The flip-flop 14 is set when pulses are generated from the AND circuit 17. The flip-flop 14 makes the output of the line 32 high level in its set state, and the output of the line 33 high level in its reset state. AND circuits 19 and 20 are for generating signals that indicate demodulated data. The AND circuit 19 causes the data 1 signal that becomes high level only when all of the signals on the lines 25 and 32, and the output of the AND circuit 16 are at high level, which indicates bit "1". On the other hand, the AND circuit 20 causes the data 0 signal that becomes high level only when all of the signals on the lines 25 and 33, and the output of the AND circuit 16 are at high level, which indicates bit "0".

AND circuits 18 and 21 and OR circuit 23 are provided to generate an error detecting signal if the input signals are in any abnormal condition. The AND circuit 18 gates the peak detecting pulses to the OR circuit 23 when the signals on the line 24 are at high level. In response to this condition, the OR circuit 23 generates an error detecting signal on the line 29. AND circuit 18 utilizes the signal A+C as its input to detect an abnormal condition where the peak detecting pulse is generated either in a time frame determined by that the output A of the comparator 7 is at low level (too early), or in a time frame determined by that the output C of the comparator 9 is at high level (too late).

On the other hand, AND circuit 21 acts to generate an error detecting signal by gating to the OR circuit 23 the pulse caused from the AND circuit 23 in a condition where the flip-flop 14 is set. Consequently, this arrangement allows to detect such an abnormal condition that two peak detecting pulses are generated in a time frame determined by the signal $A.\overline{B}$.

Figure 3:
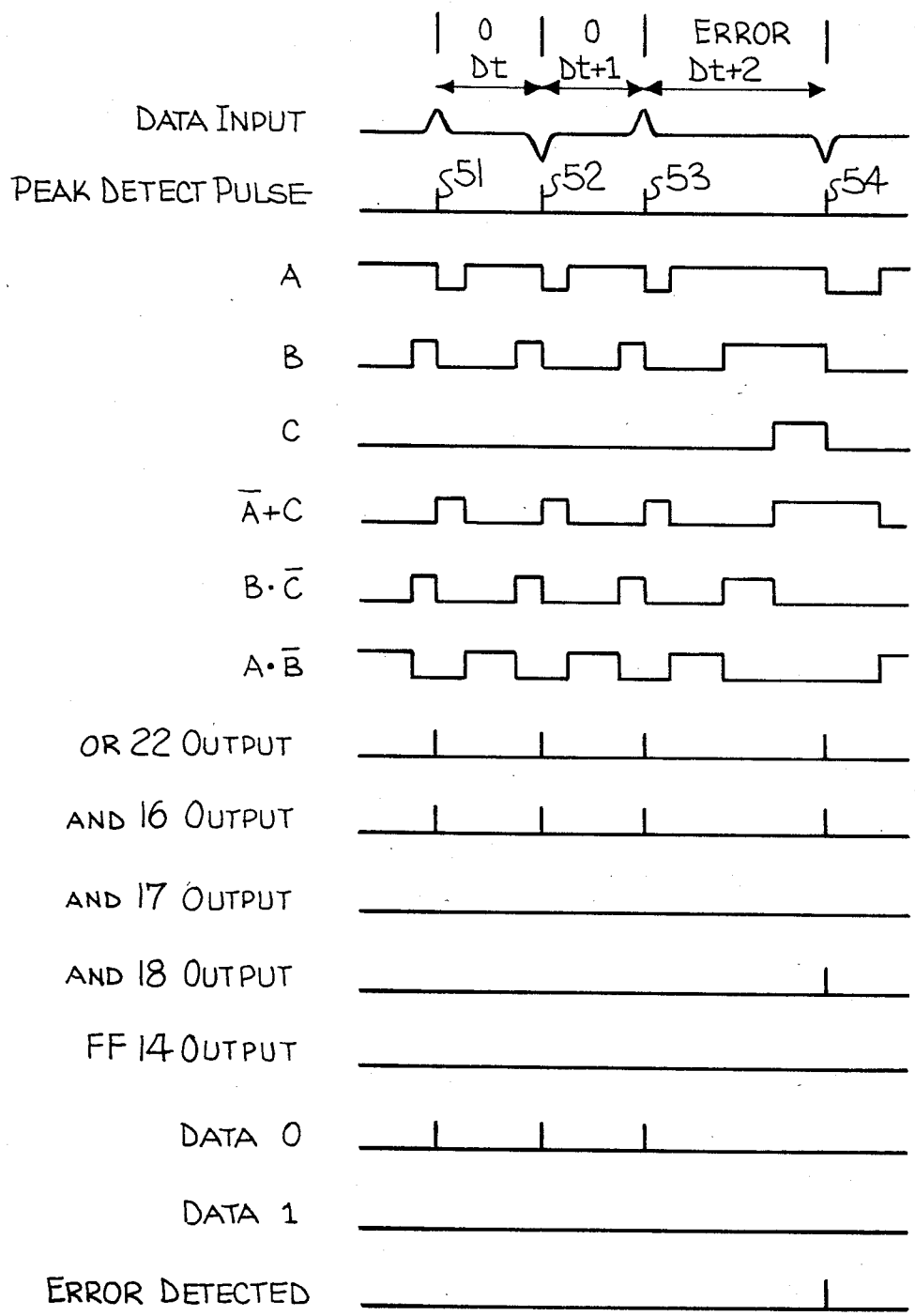
Figure 4:
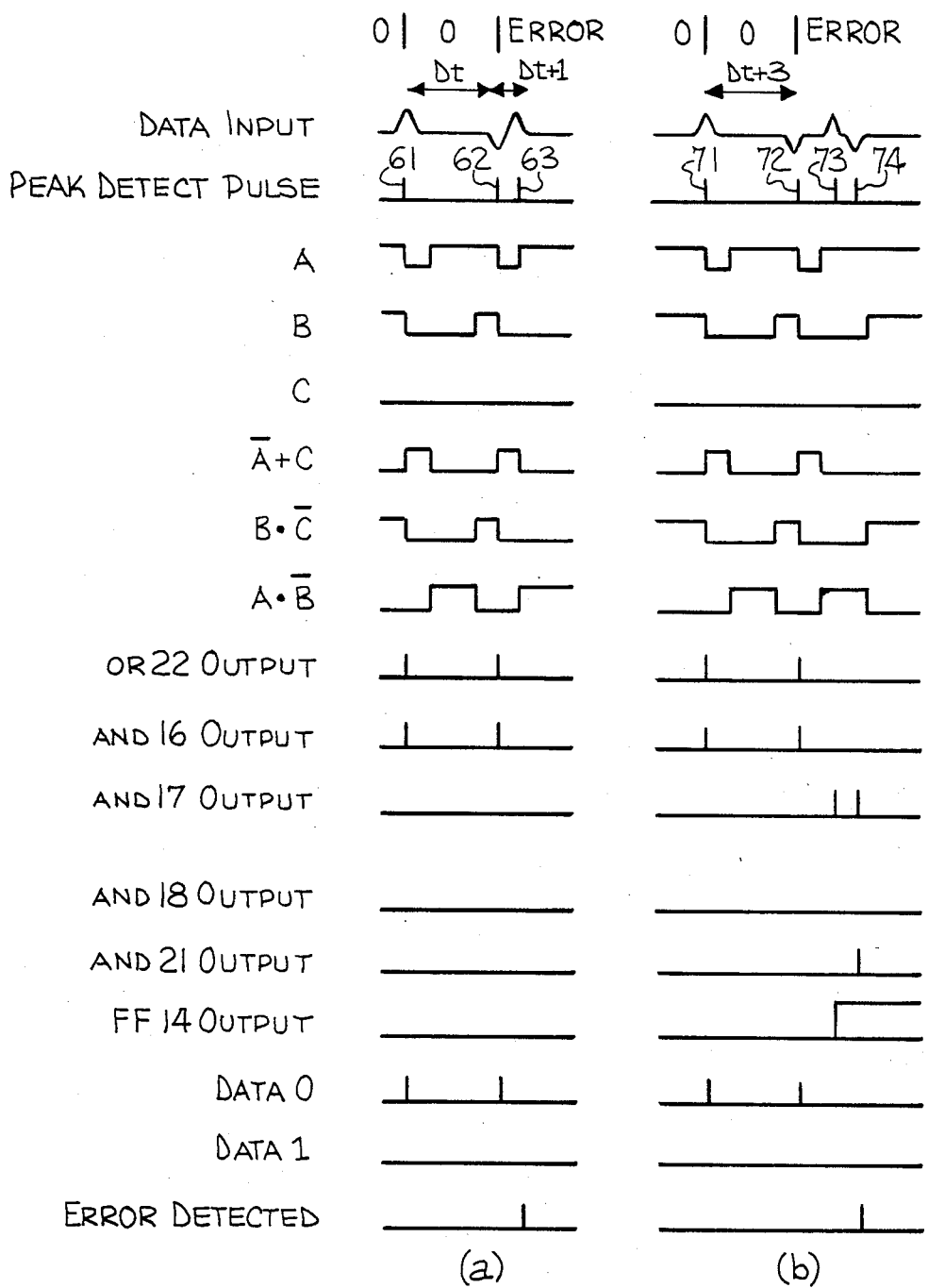

Now, the operation of the demodulator in FIG. 1 is described in more detail, referring to FIGS. 2 through 4. First, a brief description is given to the judging criteria wherein this demodulator detects data. It is arranged in such a manner that a peak detecting pulse is recognized as one representing bit "1" if the pulse is generated during a time frame that begins when time period corresponding to 0.25 times of the duration D of the preceding bit time expires after a reference point at which a peak detecting pulse indicating beginning of each bit time or an output pulse of the OR circuit 22 appears and that has a duration corresponding to (0.75−0.25)D; and that a peak pulse is recognized as one representing bit "0" if the pulse is not generated during the said time frame, but is generated during the succeeding time frame that has a duration corresponding to (1.25−0.75)D.

FIG. 2 shows a manner wherein normal input signals are processed. First, the time counter 2 counts from the instant at which the output pulse of the OR circuit 22, corresponding to the peak detecting pulse 41, is generated to the instant at which the output pulse of the OR circuit 22, corresponding to the next peak detecting pulse 42, is generated so as to measure the duration of the bit time T0. In response to the generation of this second output pulse, the count of the time counter 2 is transferred to the register 3. At the same time, the counter 2 is reset and restarts the counting. The count received by the register 3 represents the duration $D_t$ of the bit time T0, and are utilized in the next bit time T1. The signal part in the bit time T0 corresponds to a preamble preceding actual data, and is not detected as data. However, because it is required to indicate the time duration between clock pulses C to be a reference, this preamble is recorded as to indicate bit "0".

When the peak detecting pulse 42 is generated, the counter 2 makes the output low level to allow detection of the succeeding data.

As described, the multipliers 4, 5 and 6 multiply the count stored in the register 3 by 0.25, 0.75 and 1.25 times respectively, and supply them to the comparator 7, 8 and 9. These comparators generate high level output A, B and C when the count of the time counter 2 becomes larger than the output of the multipliers 4, 5 and 6.

Because, in the example of FIG. 2, the signal in the bit time T1 represents bit "0", the next peak detecting pulse 43 is generated when the signal $B.\overline{C}$ of the decoder 10 is at high level. At this time, because a pulse is also generated from the AND circuit 16, and the flip-flop 14 is in a reset state, the AND circuit 20 generates the data 0 signal on the line 31. The pulse generated from the AND circuit 16 activates the time counter 2 and the register 3 to transfer the count to the register 3, and resets the time counter 2. The succeeding operational manner of the multipliers 4 through 6 and the comparator 7 through 9 is the same as that in the preceding bit time T1. However, the timing when the levels of the output A, B and C vary depends on the counts representing the duration $D_{t+1}$ of the bit time T1.

Because, in this example, the signal in the bit time T2 represents bit "1", the next peak detecting pulse 44 is generated during which the signal $A.\overline{B}$ is at high level. Therefore, the AND circuit generates a pulse to set the flip-flop 14. At this stage, however, the data 1 signal is not yet generated on the line 30. Then, when the peak detecting clock pulse 45, which indicates the end of the bit time T2, or the beginning of the next bit time T3, is generated while the signal $B.\overline{C}$ is at high level, the input requirement for the AND circuit 19 is fulfilled, and a data signal appears on the line 30. At the same time, the flip-flop 14 is reset by an output pulse of the OR circuit 22. And, in response to this output pulse, the count in the time counter 2 is transferred to the register 3. In succeeding T3 and T4, similar operations take place. Since FIG. 2 shows the example wherein normal input data signals are processed, no error detecting signal is generated.

FIG. 3 shows an operation of the demodulator where a peak interval is abnormally long in a part of a signal. A possible cause of such abnormal signal is that reading of a record failed because of bounce of a head or attachment of dirt on the recording medium. The operation of the demodulator in FIG. 1 in response to the generation of the peak detecting pulses 51, 52 and 53 is the same as that described for FIG. 2. The count stored in the register 3 when the peak detecting pulse 53 is generated represents the duration of time $D_{t+1}$ between the peak detecting pulses 52 and 53, basing on which the timing for varying the levels of the output A, B and C from the comparator 7 through 9 thereafter is determined. In this example, the duration of time $D_{t+2}$ until generation of the next peak detecting pulse 54 is longer than 1.25 $D_{t+1}$. Namely, the peak detecting pulse 54 is generated while the output C of the comparator 9, or the signal A+C is at high level. Therefore, the AND circuit 18 gates the peak detecting pulse 54 to generate an error detecting signal from the OR circuit 23.

Both FIG. 4 (a) and (b) show the operation of the demodulator when the peak interval is abnormally short in a part of signals. A possible cause of such abnormal signal is that noise interferes with the reading because of mechanical vibrations, or that relative speed between the head and the recording media is suddenly varied. Now, referring to the part (a), at the generation of the peak detecting pulse 62, stored in the register 3 is the count representing the duration of time $D_t$ between it and the preceding peak detecting pulse 61. Then, the next peak detecting pulse 63 appears after the duration of 0.25 $D_t$ expires, that is, during the output A is at low level, or during the signal $\overline{A}+C$ is at high level. Therefore, also in this case, an error detecting signal is generated by the action of the AND circuit 18 and the OR circuit 23.

FIG. 4 (b) shows a state where two peak detecting pulses 73 and 74 successively appear during the time that begins when the duration of 0.25 $D_{t+3}$ expires by making the generation of the peak detecting pulse 72 a reference point after the peak detecting pulses 71 and 72 are generated at the proper time interval of $D_{t+3}$, and that has the duration of 0.75–0.25 $D_{t+3}$ (that is, during the signal $A.\overline{B}$ is at high level). First, the AND circuit 17 generates a pulse in response to the peak detecting pulse 73 to set the flip-flop 14. When the next peak detecting pulse 74 is generated, the AND circuit 17 also generates a pulse. Therefore, the input requirement is fulfilled for the AND circuit 21, from which a pulse generated appears as an error detecting signal on the line 29 through the OR circuit 23.

As above, the demodulator, according to this invention, can accurately perform demodulation of data and detection of errors, even in such situation that peak intervals are somewhat modulated. This invention is not restricted to the above mentioned embodiment, but can be embodied in various forms. For example, the magnification of the multipliers may be selected at values other than 0.25, 0.75 and 1.25. In addition, the comparators may be arranged so that they generate high level output when the counts of the time counter are smaller than the output of the multipliers. In such case, it can be attained by suitable changing the logic combination function of the decoder 10.

Having thus described my invention, what I claim as new and desire to secure by Letters Patent is:

1. A demodulator for extracting data from a stream of binary signals that may be of varying frequency, said stream of binary signals comprising clock signals and data signals between said clock signals and including means for receiving said stream of signals, means for detecting individual one of said signals and means for generating output data signals in response to the data signal content of said stream of signals, and wherein the improvement comprises:

means for individually measuring the time duration between each set of successive clock signals, the time duration between each set of clock signals dynamically changing as a function of the frequency of the stream of binary signals, means responsive to each of said measured time durations for dynamically establishing a predetermined time interval during which succeeding valid data or clock signals can be anticipated, the time duration of each of the predetermined time intervals changing as a function of the time duration between each pair of successive clock signals, means responsive to the detection of a signal during a time other than said predetermined established time interval for generating an error output signal, and means responsive to the detection of more than one signal within said predetermined established time interval during which a single valid data signal can be anticipated for generating an error output signal.

2. A demodulator for extracting data as defined in claim 1 wherein the predetermined time interval during which predetermined valid data signals can be anticipated begins at the fraction $\alpha$ of said time duration following a clock signal and extends to the fraction $\beta$ of said time duration following the clock signal, and wherein $0<\alpha<\beta<1$.

3. A demodulator for extracting data as defined in claim 1 wherein the predetermined time interval during which succeeding valid clock signals can be anticipated begins at the fraction $\beta$ of said duration following a clock signal and extends following the clock signal by an amount $\gamma$ times greater than said time duration; wherein $0<\beta<1<\gamma$.

4. A demodulator for extracting data as defined in claim 2 wherein the predetermined time interval during which succeeding valid clock signals can be anticipated begins at the fraction $\beta$ of said time duration following a clock signal and extends following the clock signal by an amount $\gamma$ times greater than said time duration; wherein $0<\beta<1<\gamma$.

5. A demodulator for extracting data as defined in claim 1 wherein the said time duration measuring means operates upon each detection of a valid clock signal.

* * * * *